United States Patent
Ren et al.

(10) Patent No.: US 9,510,344 B2
(45) Date of Patent: Nov. 29, 2016

(54) BASE STATION, COGNITIVE RADIO SYSTEM, AND CONTROL METHOD FOR A NEIGHBOUR RELATIONSHIP

(71) Applicant: ZTE Corporation, Shenzhen, Guangdong (CN)

(72) Inventors: Longtao Ren, Shenzhen (CN); Yan Li, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 75 days.

(21) Appl. No.: 14/407,121

(22) PCT Filed: Jun. 21, 2013

(86) PCT No.: PCT/CN2013/077709
§ 371 (c)(1),
(2) Date: Dec. 11, 2014

(87) PCT Pub. No.: WO2013/189310
PCT Pub. Date: Dec. 27, 2013

(65) Prior Publication Data
US 2015/0110041 A1    Apr. 23, 2015

(30) Foreign Application Priority Data
Jun. 21, 2012  (CN) .......................... 2012 1 0207813

(51) Int. Cl.
H04W 4/00      (2009.01)
H04W 72/04     (2009.01)
H04W 16/14     (2009.01)

(52) U.S. Cl.
CPC ......... *H04W 72/0426* (2013.01); *H04W 16/14* (2013.01); *H04W 72/048* (2013.01)

(58) Field of Classification Search
CPC ........... H04W 72/0426; H04W 16/14; H04W 72/048
See application file for complete search history.

(56) References Cited

U.S. PATENT DOCUMENTS

| 7,979,076 | B2 | 7/2011 | Hui |
| 2007/0117537 | A1* | 5/2007 | Hui ...................... H04W 16/10 455/405 |
| 2008/0192686 | A1* | 8/2008 | Cho ...................... H04W 16/14 370/329 |
| 2011/0250858 | A1* | 10/2011 | Jain ...................... H04W 16/14 455/120 |
| 2012/0120887 | A1* | 5/2012 | Deaton ................. H04W 16/14 370/329 |

FOREIGN PATENT DOCUMENTS

| CN | 1960575 A | 5/2007 |
| CN | 101741486 A | 6/2010 |
| CN | 102223191 A | 10/2011 |

OTHER PUBLICATIONS

International Search Report in international application No. PCT/CN2013/077709, mailed on Sep. 26, 2013.
English Translation of the Written Opinion of the International Search Authority in international application No. PCT/CN2013/077709, mailed on Sep. 26, 2013.
Supplementary European Search Report in European application No. 13807201.2, mailed on Nov. 18, 2015.

* cited by examiner

*Primary Examiner* — Abdelnabi O Musa
(74) *Attorney, Agent, or Firm* — Oppedahl Patent Law Firm LLC

(57) ABSTRACT

Provided is a cognitive radio system CRS, a base station and a method for controlling a neighbor relationship, including: a serving base station actively notifies a neighbor base station of transport layer configuration information after resource reconfiguration, the neighbor base station thus performs a maintenance operation on locally saved neighbor cell information of the serving base station, which can solve the problem that the change in the neighbor relationship affects terminal services.

18 Claims, 4 Drawing Sheets

BASE STATION, COGNITIVE RADIO SYSTEM, AND CONTROL METHOD FOR A NEIGHBOUR RELATIONSHIP

TECHNICAL FIELD

The disclosure relates to the field of radio communications, in particular to a method and Cognitive Radio System (CRS) for resource configuration and maintenance operation neighboring base station(s).

BACKGROUND

A variety of application scenarios are involved in a CRS. The main application scenarios in an International Mobile Telecommunication Bands (IMT-Bands) system include: 1) reformation or substitution of spectrums of a conventional radio access technology, and deployment of a new technology in a frequency range of the conventional technology, e.g., deploying a Long Term Evolution (LTE) technology on the frequency band used by existing Global System for Mobile Communication (GSM); 2) optimization of resources of a radio system and borrowing of different resources of the radio access technology, e.g., a Universal Mobile Telecommunication System (UMTS) currently with excessive services and insufficient resources may borrow resources from the GSM technology with less services and redundant resources in a same base station or a neighbouring area, and is served using the white space of the GSM; 3) deployment of a new RAT in an existing area, or upgrade of a system, for example, the UMTS is upgraded to a High Speed Packet Access (HSPA) technology; 4) the negotiated use of services carried by resources of Time Division Duplex (TDD) and Frequency Division Duplex (FDD) of various modes. Except for the IMT-Band system, some frequency bands within the television frequency bands are not used any more or are used at a low utilization rate (e.g., a broadcast band is not occupied by any television signal in a certain period). Therefore, part of spectrum resources within the television band may be borrowed for radio communications. The TV White Space (TVWS) may be applied for not only the radio communications in a large range, for example, the communication between a base station and a mobile terminal, but also the short range communications such as interior communications. No matter in the IMT-Band system or the utilization of TVWS resources, the neighbour relationship might be influenced by a newly added frequency point or an added cell using a new frequency point, and the change of system bandwidth.

The measuring objects of a terminal are a system and frequency points, the change of frequency points leading to the change of surrounding radio environment. Thus, in the CRS, the change of the neighbour relationship caused by the re-allocation of resources has a great effect on terminal services: on one hand, if a terminal in a neighbour cell does not acquire any newly added frequency point, the terminal will not measure the signal at this newly added frequency point and not reselect a cell or switch to this frequency point, thereby leading to a failure of residence of the terminal or a service interruption; on the other hand, when the base station performs the re-allocation of resources in the CRS, the newly added frequency point may be used for a very short time, that is, even if the terminal acquires this frequency point, there will not be much benefits for the measurement and mobility of the terminal, whereas the expenditure of signalling and the power consumption of the terminal may be increased.

SUMMARY

To this end, a method and CRS for resource configuration and maintenance operation neighboring base station(s), so as to solve the problem that the change in the neighbour relationship affects terminal services.

The solution of the disclosure is implemented as below.

The disclosure provides a method for controlling a neighbour relationship in a CRS, the method including that when resource reconfiguration occurs in a serving base station, the serving base station actively notifies a neighbouring base station of transport layer configuration information after the resource reconfiguration.

The disclosure further provides a method for controlling a neighbour relationship in a CRS, the method including that when resource reconfiguration occurs in a serving base station, the serving base station determines the necessity of notifying a neighbouring base station based on the payload, and/or resource utilization, and/or resource reconfiguration type of the serving base station, and then actively notifies the neighbouring base station of the transport layer configuration information after the resource reconfiguration if necessary.

In the scheme described above, actively notifying the neighbouring base station of the transport layer configuration information after the resource reconfiguration may include that the serving base station notifies the neighbouring base station of the transport layer configuration information through a direct interface; or, the serving base station notifies the neighbouring base station of the transport layer configuration information through a core network node or an upper management node.

The disclosure further provides a method for controlling a neighbour relationship in a CRS, the method including that a neighbouring base station of a serving base station receives transport layer configuration information of which the serving base station actively notifies the neighbouring base station after resource reconfiguration, and performs a maintenance operation on the locally saved neighbour cell information of the serving base station.

In the scheme described above, performing the maintenance operation on the locally saved neighbour cell information of the serving base station may include performing an addition, or deletion, or modification, or maintenance operation on the locally saved neighbour cell information of the serving base station.

In the scheme described above, before performing the maintenance operation on the locally saved neighbour cell information of the serving base station, the method further may include that the neighbouring base station sends the transport layer configuration information of the serving base station to a subordinate terminal and receives a measurement report which is reported by the subordinate terminal;

accordingly, performing the maintenance operation on the locally saved neighbour cell information of the serving base station may include that the neighbouring base station performs the maintenance operation on the locally saved neighbour cell information of the serving base station based on signal intensity, frequency-point effective time and the number of measured samples of a new frequency point of the serving base station in the measurement report.

In the scheme described above, after performing the maintenance operation on the locally saved neighbour cell information of the serving base station, the method further may include that the neighbouring base station sends the transport layer configuration information of the serving base station to a subordinate terminal and receives a measurement report which is reported by the subordinate terminal; the neighbouring base station then performs the maintenance operation on locally saved neighbour cell information of the serving base station again based on signal intensity, frequency-point effective time and the number of measured samples of a new frequency point of the serving base station in the measurement report.

In the scheme described above, the transport layer configuration information may include the frequency-point effective time;

after performing the maintenance operation on the locally saved neighbour cell information of the serving base station, the method further may include that when the neighbouring base station determines that the frequency-point effective time in the transport layer configuration information is less than a preset threshold, or when the neighbouring base station itself decides not to measure a new frequency point in the transport layer configuration information, the neighbouring base station adds the new frequency point in the transport layer configuration information to a blacklist and notifying its subordinate terminal of the blacklist through a system broadcast message or a reconfiguration message.

The disclosure also provides a method for controlling a neighbour relationship in a CRS, the method including:

when resource reconfiguration occurs in a serving base station, the serving base station determines the necessity to notify a neighbouring base station based on the payload and/or resource utilization and/or resource reconfiguration type of the serving base station, and then actively notifies the neighbouring base station of transport layer configuration information after the resource reconfiguration, if necessary;

the neighbouring base station receives the transport layer configuration information and performs a maintenance operation on locally saved neighbour cell information of the serving base station.

In the scheme described above, actively notifying the neighbouring base station of the transport layer configuration information after the resource reconfiguration may include that the serving base station notifies the neighbouring base station of the transport layer configuration information through a direct interface; or, the serving base station notifies the neighbouring base station of the transport layer configuration information through a core network node or an upper management node.

In the scheme described above, performing the maintenance operation on the locally saved neighbour cell information of the serving base station may include performing an addition, or deletion, or modification, or maintenance operation on the locally saved neighbour cell information of the serving base station.

In the scheme described above, before performing the maintenance operation on the locally saved neighbour cell information of the serving base station, the method further may include that the neighbouring base station sends the transport layer configuration information of the serving base station to a subordinate terminal and receives a measurement report which is reported by the subordinate terminal;

accordingly, performing the maintenance operation on the locally saved neighbour cell information of the serving base station may include that the neighbouring base station performs the maintenance operation on the locally saved neighbour cell information of the serving base station based on signal intensity, frequency-point effective time and number of measured samples of a new frequency point of the serving base station in the measurement report.

In the scheme described above, after performing the maintenance operation on the locally saved neighbour cell information of the serving base station, the method further may include that the neighbouring base station sends the transport layer configuration information of the serving base station to the subordinate terminal and receives a measurement report which is reported by the subordinate terminal; the neighbouring base station performs a maintenance operation on the locally saved neighbour cell information of the serving base station again based on signal intensity, frequency-point effective time and number of measured samples of the new frequency point of the serving base station in the measurement report.

In the scheme described above, the transport layer configuration information may include the frequency-point effective time;

after performing the maintenance operation on the locally saved neighbour cell information of the serving base station, the method further may include that when the neighbouring base station determines that the frequency-point effective time in the transport layer configuration information is less than a preset threshold, or when the neighbouring base station itself decides not to measure the new frequency point in the transport layer configuration information, the neighbouring base station adds a new frequency point in the transport layer configuration information to a blacklist and notifying its subordinate terminal of the blacklist through a system broadcast message or a reconfiguration message.

The disclosure also provides a serving base station, which is for determining the necessity of notifying a neighbouring base station based on the payload, and/or resource utilization, and/or resource reconfiguration type of the serving base station when resource reconfiguration occurs in the serving base station, and then actively notifying the neighbouring base station of transport layer configuration information after the resource reconfiguration.

In the scheme described above, the serving base station may be configured to notify the neighbouring base station of the transport layer configuration information through a direct interface; or, notify the neighbouring base station of the transport layer configuration information through a core network node or an upper management node.

The disclosure also provides a neighbouring base station of a serving base station, which is configured to receive transport layer configuration information of which the serving base station actively notifies the neighbouring base station after resource reconfiguration and perform a maintenance operation on locally saved neighbour cell information of the serving base station.

In the scheme described above, when the neighbouring base station performs a maintenance operation on the locally saved neighbour cell information of the serving base station, the neighbouring base station may be specifically configured to perform an addition, or deletion, or modification, or maintenance operation on the locally saved neighbour cell information of the serving base station.

In the scheme described above, before the neighbouring base station performs the maintenance operation on the locally saved neighbour cell information of the serving base station, the neighbouring base station may be further configured to send the transport layer configuration information of the serving base station to a subordinate terminal and receive a measurement report which is reported by the subordinate terminal;

accordingly, when the neighbouring base station performs the maintenance operation on the locally saved neighbour cell information of the serving base station, the neighbouring base station may be further configured to perform the maintenance operation on the locally saved neighbour cell information of the serving base station based on signal intensity, frequency-point effective time and the number of measured samples of a new frequency point of the serving base station in the measurement report.

In the scheme described above, after the neighbouring base station performs the maintenance operation on the locally saved neighbour cell information of the serving base station, the neighbouring base station may be further configured to send the transport layer configuration information of the serving base station to a subordinate terminal, receive a measurement report which is reported by the subordinate terminal, and perform the maintenance operation on the locally saved neighbour cell information of the serving base station again based on signal intensity, frequency-point effective time and the number of measured samples of the new frequency point of the serving base station in the measurement report.

In the scheme described above, the transport layer configuration information may include the frequency-point effective time;

after the neighbouring base station performs the maintenance operation on the locally saved neighbour cell information of the serving base station, the neighbouring base station may be further configured to, when determining that the frequency-point effective time in the transport layer configuration information is less than a preset threshold or deciding by itself not to measure a new frequency point in the transport layer configuration information, add the new frequency point in the transport layer configuration information to a blacklist and notify its subordinate terminal of the blacklist through a system broadcast message or a reconfiguration message.

The disclosure also provides a CRS, which includes a serving base station and a neighbouring base station of the serving base station; wherein the serving base station is configured to determine the necessity of notifying the neighbouring base station based on the payload, and/or resource utilization, and/or resource reconfiguration type of the serving base station during resource reconfiguration, and then actively notify the neighbouring base station of the transport layer configuration information after resource reconfiguration if necessary;

the neighbouring base station is configured to receive the transport layer configuration information and perform a maintenance operation on the locally saved neighbour cell information of the serving base station.

In the scheme described above, the serving base station may be specifically configured to notify a neighbouring base station of the transport layer configuration information through a direct interface; and/or, notify the neighbouring base station of the transport layer configuration information through a core network node or an upper management node.

In the scheme described above, when the neighbouring base station performs the maintenance operation on the locally saved neighbour cell information of the serving base station, the neighbouring base station may be configured to perform an addition, or deletion, or modification, or maintenance operation on the locally saved neighbour cell information of the serving base station.

In the scheme described above, the neighbouring base station may be further configured to send the transport layer configuration information of the serving base station to a subordinate terminal, receive a measurement report which is reported by the subordinate terminal, and perform a maintenance operation on the locally saved neighbour cell information of the serving base station based on signal intensity, frequency-point effective time and the number of measured samples of the new frequency point of the serving base station in the measurement report.

In the scheme described above, after the neighbouring base station performs the maintenance operation on the locally saved neighbour cell information of the serving base station, the neighbouring base station may be further configured to send the transport layer configuration information of the serving base station to a subordinate terminal, receive a measurement report which is reported by the subordinate terminal, and perform the maintenance operation on the locally saved neighbour cell information of the serving base station again based on signal intensity, frequency-point effective time and the number of measured samples of the new frequency point of the serving base station in the measurement report.

In the scheme described above, the transport layer configuration information may include frequency-point effective time; the neighbouring base station may be further configured to, when determining that the frequency-point effective time in the transport layer configuration information is less than a preset threshold or deciding by itself not to measure a new frequency point in the transport layer configuration information, add the new frequency point in the transport layer configuration information to a blacklist and notify its subordinate terminal of the blacklist through a system broadcast message or a reconfiguration message.

The method for resource configuration and maintenance operation neighboring base station(s) in a CRS of the disclosure, in which a serving base station actively notifies a neighbouring base station of the transport layer configuration information after resource reconfiguration and the neighbouring base station performs a maintenance operation on the locally saved neighbour cell information of the serving base station, thereby enabling the neighbour relationship of a base station to be updated in real time, making it easier for the neighbouring base station to notify a subordinate terminal to conduct reconfiguration, which is advantageous to the measurement and the mobility of the terminal and avoidance of a bad effect caused by the resource reconfiguration in the serving base station on terminal services. This enables the terminal to acquire current resource state of the serving base station in time and therefore to efficiently use currently available resources of the serving base station to reselect a cell or switch frequency points, and then keeps the continuity of terminal services, thus preventing the change of the neighbour relationship of the serving base station from affecting the terminal services, and improving the resource utilization and keeping the continuity of terminal services.

DETAILED DESCRIPTION

The basic concept of the disclosure is that a serving base station actively notifies an neighbouring base station of the changed transport layer configuration information, making the neighbouring base station to update and maintain the neighbour relationship in time.

Figure 1:
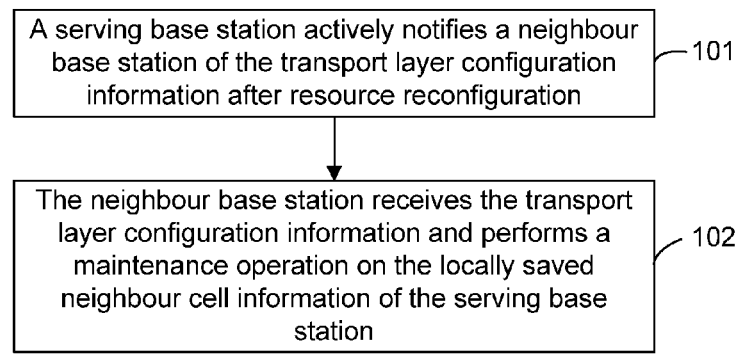
FIG. 1 is a flowchart for realization of a method for controlling a neighbour relationship in a CRS according to the disclosure.

As shown in FIG. 1, the method for controlling a neighbour relationship in a CRS according to the disclosure may include the following steps.

Step 101: a serving base station actively notifies a neighbouring base station of transport layer configuration information after resource reconfiguration.

The resource reconfiguration may be a process such as addition of a frequency point, change in bandwidth, substitution of RAT, and etc. which may lead to a change of the transport layer configuration information of the base station.

Step 102: the neighbouring base station receives the transport layer configuration information and performs a maintenance operation on the locally saved neighbour cell information of the serving base station.

The serving base station herein refers to the base station that is operating currently and is ready for the resource reconfiguration; the neighbouring base station is the neighbouring base station adjacent to the serving base station and may be one or more base stations. The serving base station and the neighbouring base station may be either normal base stations such as eNBs, NodeBs, or femtocells, or access points (e.g. Relay Nodes), belonging to either a same radio access system or different radio access systems. The radio access system herein refers to GSM, UMTS, TD-SCDMA, CDMA2000, LTE, LTE-A, etc.

The transport layer configuration information herein may include a frequency point identifier, a base station identifier, a cell identifier (e.g. PCI, CGI), an operation mode (e.g. FDD or TDD). In addition, the transport layer configuration information may also include a Radio Access Type (RAT), bandwidth and frequency-point effective times. The frequency-point effective times may be configured beforehand by the network side (e.g. configured by a network management side) or configured by the base station itself; specifically, the effective time may be a time span (e.g. 5 hours) or a period of time (e.g. from a certain time to a certain time).

The neighbour cell information saved locally in the neighbouring base station herein may include an RAT, operation mode (FDD and/or TDD), a frequency point identifier, a cell identifier (PCI and/or CGI), cell attribution information (whether it is allowed to perform a handoff, to create a direct interface, or to delete). The neighbour cell information saved locally in the neighbouring base station includes the adjacent information of the serving base station.

Performing a maintenance operation on the locally saved neighbour cell information of the serving base station herein refers to performing one of the operations below on the locally saved neighbour cell information of the serving base station: addition, deletion, modification and maintenance. For example, when a new frequency point is added to a serving base station, corresponding transport layer configuration information includes the relevant information of this new frequency point, and a neighbouring base station adds this new frequency point to the locally saved neighbour cell information of the serving base station according to the corresponding transport layer configuration information after the corresponding transport layer configuration information is received by the neighbouring base station; for another example, when the serving base station deletes the new frequency point, corresponding transport layer configuration information includes the relevant information of the new frequency point, and the neighbouring base station deletes this new frequency point from the locally saved neighbour cell information of the serving base station according to the corresponding transport layer configuration information after the corresponding transport layer configuration information is received by the neighbouring base station; for another example, when the serving base station changes the bandwidth of a certain frequency point, corresponding transport layer configuration information includes the bandwidth information of the certain frequency point, the neighbouring base station modifies the bandwidth information of the certain frequency point in the locally saved neighbour cell information of the serving base station according to the corresponding transport layer configuration information after the corresponding transport layer configuration information is received by the neighbouring base station.

Specifically, when the serving base station takes a resource reconfiguration, the serving base station makes a decision based on its own payload, and/or resource utilization, and/or resource reconfiguration type, and then the serving base station actively notifies the neighbouring base station of the transport layer configuration information after the resource reconfiguration if the serving base station determines that it is necessary to notify the neighbouring base station. The resource reconfiguration type herein may be radio resource optimization (e.g. addition of a new frequency point and/or a new cell), reorganization of spectrum, upgrading of an existing RAT, deployment of a new RAT, addition of FDD, TDD and other modes.

Specifically, when the serving base station performs a resource reconfiguration, the serving base station may either notify the neighbouring base station of the transport layer configuration information through a direct interface, or notify the neighbouring base station of the transport layer configuration information through a core network node or an upper management node. The direct interface herein refers to an interface through which the serving base station and the neighbouring base station may interact with each other directly, such as an X2 interface of LTE/LTE-A, a Iur interface of UMTS, and so on. The core network node refers to a node for managing user information of a radio access network side, such as a SGW, a PGW and an MME of LTE/LTE-A, and a GGSN and an SGSN of UMTS, and a GMSC and an MSC of GSM, and so on. The upper management node refers to a node for managing configuration information at a base station side, such as a network management side (e.g. EMS, NMS), a reconfiguration entity, a central control node, and so on.

Before performing a maintenance operation on the locally saved neighbour cell information of the serving base station, the method also includes that the neighbouring base station sends the transport layer configuration information of the serving base station to a subordinate terminal and receives a measurement report from the terminal; specifically, performing a maintenance operation on the locally saved neighbour cell information of the serving base station may be that the neighbouring base station performs a maintenance operation on the locally saved neighbour cell information of the serving base station based on the signal intensity, effective time and the number of measured samples of a new frequency point of the serving base station in the measurement report.

After the neighbouring base station performs a maintenance operation on the locally saved neighbour cell information of the serving base station, the method also includes that when the neighbouring base station determines that the frequency-point effective time in the transport layer configuration information is less than a preset threshold, or the neighbouring base station itself decides not to measure a new frequency point in the transport layer configuration information, the neighbouring base station then adds the new frequency point in the transport configuration information to a blacklist and sends the blacklist to a subordinate terminal through a system broadcast message or a reconfiguration message. The blacklist herein is for indicating the terminal not to measure and report a designated frequency point.

After the neighbouring base station performs a maintenance operation on the locally saved neighbour cell information of the serving base station, the method may also include that the neighbouring base station sends the transport layer configuration information of the serving base station to a subordinate terminal, receives a measurement report which is reported by the terminal, and performs a maintenance operation on the locally saved neighbour cell information of the serving base station based on the signal intensity, effective time and the number of measured samples of the new frequency point of the serving base station in the measurement report.

It should be noted that the maintenance process of the neighbour cell information is also available when the newly reconfigured frequency point of the serving base station is returned.

Accordingly, the disclosure further provides a serving base station, which is for actively notifying a neighbouring base station of transport layer configuration information after resource reconfiguration, such that the neighbouring base station receives the transport configuration information and is thus capable of performing a maintenance operation on the locally saved neighbour cell information of the serving base station.

Specifically, the serving base station is for determining the necessity of notifying the neighbouring base station based on its payload, and/or resource utilization, and/or resource reconfiguration type when the resource reconfiguration occurs, and then actively notifying the neighbouring base station of the transport layer configuration information after resource reconfiguration if necessary.

Specifically, the serving base station may be for notifying the neighbouring base station of the transport layer configuration information through a direct interface; or the serving base station may be for notifying the neighbouring base station of the transport layer configuration information through a core network node or an upper management node.

Accordingly, the disclosure further provides a neighbouring base station of a serving base station, and the neighbouring base station is for receiving transport layer configuration information which is sent by the serving base station after resource reconfiguration and performing a maintenance operation on the neighbour information of the serving base station saved locally.

Specifically, the neighbouring base station is for performing one of the operations below on the locally saved neighbour cell information of the serving base station: addition, deletion, modification and maintenance.

The neighbouring base station herein is also for sending the transport layer configuration information to a subordinate terminal and receiving a measurement report which is reported by the terminal before performing a maintenance operation on the locally saved neighbour cell information of the serving base station; specifically, performing by the neighbouring base station a maintenance operation on the locally saved neighbour cell information of the serving base station is that the neighbouring base station performs a maintenance operation on the locally saved neighbour cell information of the serving base station based on the signal intensity, effective time and the number of measured samples of a new frequency point of the serving base station in the measurement report.

The neighbouring base station herein is also for sending the transport layer configuration information to a subordinate terminal and receiving a measurement report which is reported by the terminal after performing a maintenance operation on the locally saved neighbour cell information of the serving base station, and then performing a maintenance operation on the locally saved neighbour cell information of the serving base station again based on the signal intensity, effective time and the number of measured samples of the new frequency point of the serving base station in the measurement report.

The transport layer configuration information herein includes effective time; the neighbouring base station may be also for, when determining that the frequency-point effective time in the transport layer configuration information is lower than a preset threshold or deciding not to measure a new frequency point in the transport layer configuration information after the neighbouring base station performs a maintenance operation on the neighbour cell information of the serving base station saved locally, adding the new frequency point in the transport configuration information to a blacklist and notifying a subordinate terminal of the blacklist through a system broadcast message or a reconfiguration message.

In additional, the disclosure further provides a CRS, which includes the serving base station described above and the neighbouring base station described above of the serving base station, wherein the serving base station is for actively notifying the neighbouring base station of transport layer configuration information after resource reconfiguration, and the neighbouring base station is for receiving the transport layer configuration information and performing a maintenance operation on the locally saved neighbour cell information of the serving base station.

First Embodiment

An LTE system is taken as an example to illustrate the specific realization process of the method for controlling a neighbour relationship in a CRS in this embodiment; the realization processes in other systems such as GSM, UMTS are similar.

Figure 2:
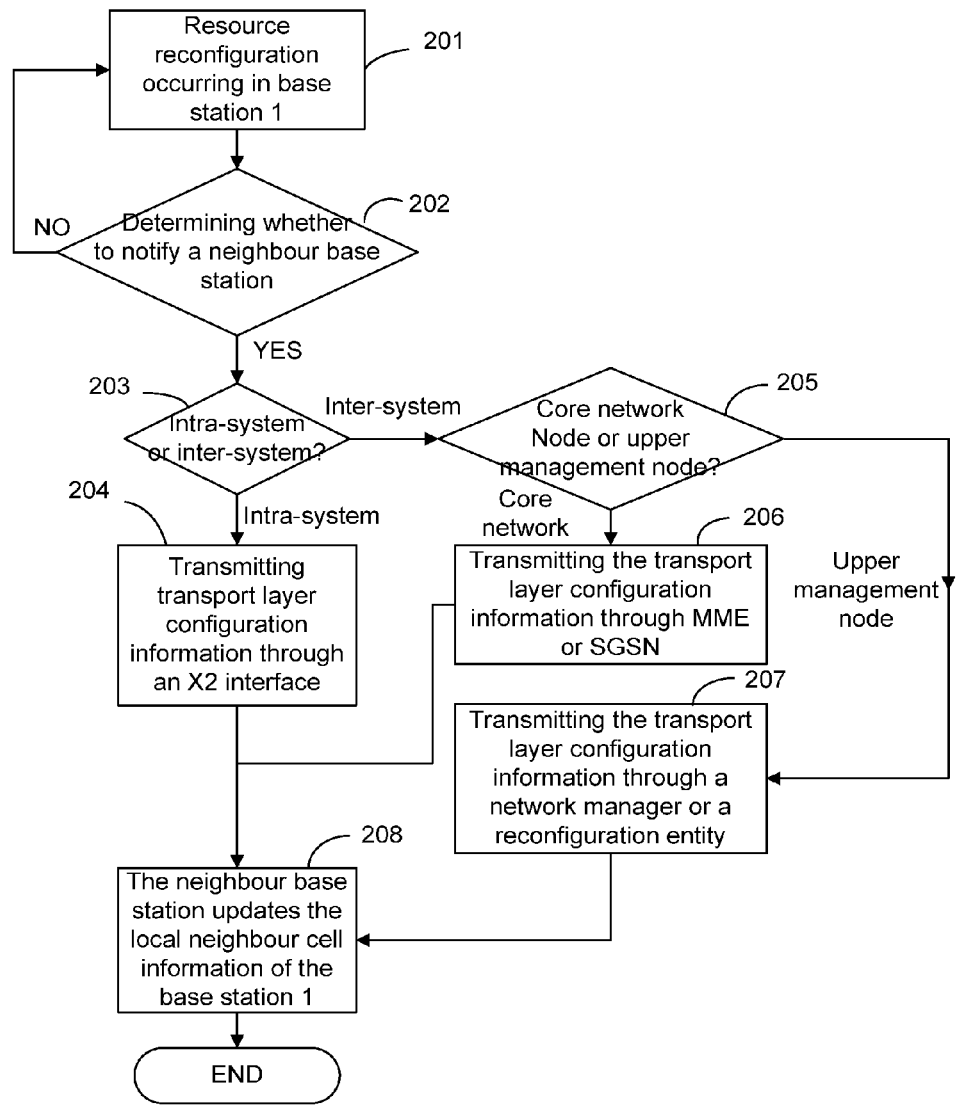
FIG. 2 is a flowchart for specific realization of the method for controlling a neighbour relationship in a CRS according to a first embodiment of the disclosure.

As shown in FIG. 2, the specific realization process of the method for controlling a neighbour relationship in a CRS in the embodiment may include the following steps.

Step 201: resource reconfiguration occurs due to overload of service payload within a base station 1, that is a serving base station eNB 1 cell in an LTE system.

Specifically, frequency resource reconfiguration may occur in the eNB 1 due to increase in data services of a terminal, for example, the supported bandwidth is reconfigured from 5 MHz to 10 MHz, therefore providing more allocable resources. The resource reconfiguration occurring in the eNB 1 may be activating and adding a new frequency point or using a new frequency to build a new cell to carry terminal services, in which the new frequency point may be a frequency point resource within an IMT-Band or an idle frequency point resource of TVWS; the new frequency point may be only used to support downlink (DL) services and/or uplink (UL) services if the eNB 1 supports the FDD mode. In practical applications, the resource reconfiguration may be deletion or modification of a frequency point, and etc.

Step 202: after resource reconfiguration, the eNB 1 determines whether it is necessary to notify the neighbouring base station based on the current payload, resource utilization (hardware and radio resources), resource reconfiguration type; if necessary, then Step 203 is executed, otherwise, Step 201 is executed.

Specifically, if the eNB 1 determines based on the current resource utilization and/or payload of the cell that terminal access is acceptable at present, for example, the terminal access may be acceptable when the payload is less than 90% and/or the resource utilization is less than 85%, then it is considered that it is necessary to notify the neighbouring base station.

The eNB 1 herein may also make a decision based on the resource reconfiguration type to decide whether to notify the neighbouring base station; for example, the eNB 1 decides to notify the neighbouring base station when the previous cell information becomes out of date due to the change of bandwidth.

Step 203: the eNB 1 determines whether the neighbouring base station and itself are in a same system or not; for a neighbouring base station eNB 2 in a same system, step 204 is executed; and for neighbouring base stations NodeB 2, NodeB 3 in different systems, step 205 is executed.

Step 204: the eNB 1 sends an eNB Configuration Update message to the neighbouring base station eNB 2 through an X2 interface, the eNB Configuration Update message containing the transport layer configuration information after resource configuration occurred in the eNB 1.

The transport layer configuration message may include a cell identifier (e.g. PCI and/or CGI), a tracking area code (e.g. TAC), a new frequency point (e.g. DL EARFCN f1 and/or UL EARFCN f2), a supported duplex mode (e.g. FDD or TDD), and a supported network type (e.g. Public Land Mobile Network, PLMN); the transport layer configuration message may further include bandwidth information if a new frequency is used to build a new cell.

In practical applications, the eNB 1 sends the configuration update message through an Iur-g interface in the case of a GSM system; the eNB 1 sends the configuration update message through an Iur interface in the case of an UMTS system.

Step 205: the eNB 1 determines whether to adopt a core network node or an upper management node to forward the transport layer configuration information after the resource reconfiguration to the neighbouring base stations NodeB2, NodeB3 which are in a system different from the eNB 1.

Step 206: if the forwarding is needed to be performed through the core network node, then the eNB 1 sends the configuration update message to the neighbouring base stations NodeB2, NodeB3 through an MME and an SGSN, the configuration update message containing the transport layer configuration information after resource reconfiguration occurred in the eNB 1.

Specifically, Step 207 is that if forwarding is needed to be performed through the upper management node, then the eNB 1 sends the configuration update message to the neighbouring base stations NodeB2, NodeB3 through a gateway or a reconfiguration entity, the configuration update message containing the transport layer configuration information after resource reconfiguration occurred in the eNB 1.

Step 208: the neighbouring base stations receive transport layer configuration information sent by the eNB 1 and update the eNB 1 neighbour cell information saved locally.

Specifically, after the eNB 2 receives the eNB 1 Configuration Update message, the eNB 2 acquires the transport layer configuration information after resource reconfiguration occurred in the eNB 1 and modifies the locally saved neighbour cell information of the eNB 1, that is, adding the information relevant to the new frequency point to the neighbour cell information of the eNB 1. The eNB 2 then may also perform reconfiguration on a subordinate terminal through a broadcast system message or a reconfiguration message, wherein the measured objects in the measurement configuration information of the reconfiguration message includes a new frequency point added after the resource reconfiguration in the eNB 1, such that the terminal is capable of detecting a signal of the new frequency point and reselects a cell or switches to the new frequency point of the eNB 1 when the signal of the new frequency point is detected to be relatively stronger. In addition, when the new frequency point of the eNB 1 is deleted, the eNB 1 would also notify the eNB 2 of the transport layer configuration information after the deletion of the new frequency point according to the above process, such that the eNB 2 updates the locally saved neighbour cell information of the serving base station and perform reconfiguration on the subordinate terminal.

In this step, the neighbouring base station may also send the information of the new frequency point in the transport layer configuration information to the subordinate terminal after receiving the transport layer configuration information sent by the eNB 1; the subordinate terminal receives the information of the new frequency point, measures the new frequency point of the eNB 1 and reports a measurement report to the neighbouring base station; the neighbouring base station receives the measurement report which is reported by the terminal and then updates the locally saved neighbour cell information of the serving base station based on the signal intensity, frequency-point effective time and the number of measured samples of the new frequency point of the serving base station in the measurement report. Specifically, the neighbouring base station receives the measurement report which is reported by the subordinate terminal and performs a statistical calculation on the measurement report, for example, determining whether the ratio of the number of measured samples with signal intensity of the new frequency point of the eNB 1 greater than a certain value (Th1) to the number of all measured samples is greater than a preset threshold N, and whether the duration from current moment to the expiration of the effective time of the frequency point is greater than a preset threshold T2, then updating the neighbour cell information of the eNB 1 if the ratio is greater than N and the duration is greater than T2, that is, adding the new frequency point of the eNB 1 to the locally saved neighbour cell information of the eNB 1, otherwise, neglecting the new frequency point of the eNB 1, that is, not adding the new frequency point of the eNB 1 to the locally saved neighbour cell information of the eNB 1.

Specifically, the NodeB 2 and the NodeB 3 modify the locally saved neighbour cell information of the eNB 1 after they receive the configuration update message sent by the eNB 1, that is, adding the information relevant to the new frequency point to the locally saved neighbour cell information of the eNB 1. Thereafter, the NodeB 2 and the NodeB 3 may also perform reconfiguration on subordinate terminals through a system broadcast message or a reconfiguration message (e.g. an RRC Connection Reconfiguration message), the measured objects in the measurement configuration information of the reconfiguration message include a new frequency point of the eNB 1, such that the terminal measures the new frequency point of the eNB 1 and reselects a cell or switches to the new frequency point of the eNB 1 when the new frequency point has a stronger signal. In addition, when the new frequency point of the eNB 1 is deleted, the eNB 1 would also notify the NodeB 2 and the NodeB 3 of the transport layer configuration information after the deletion of the new frequency point according to the process described above, such that the NodeB 2 and the NodeB 3 update corresponding neighbour cell information in time and perform reconfiguration on the subordinate terminals.

Figure 3:
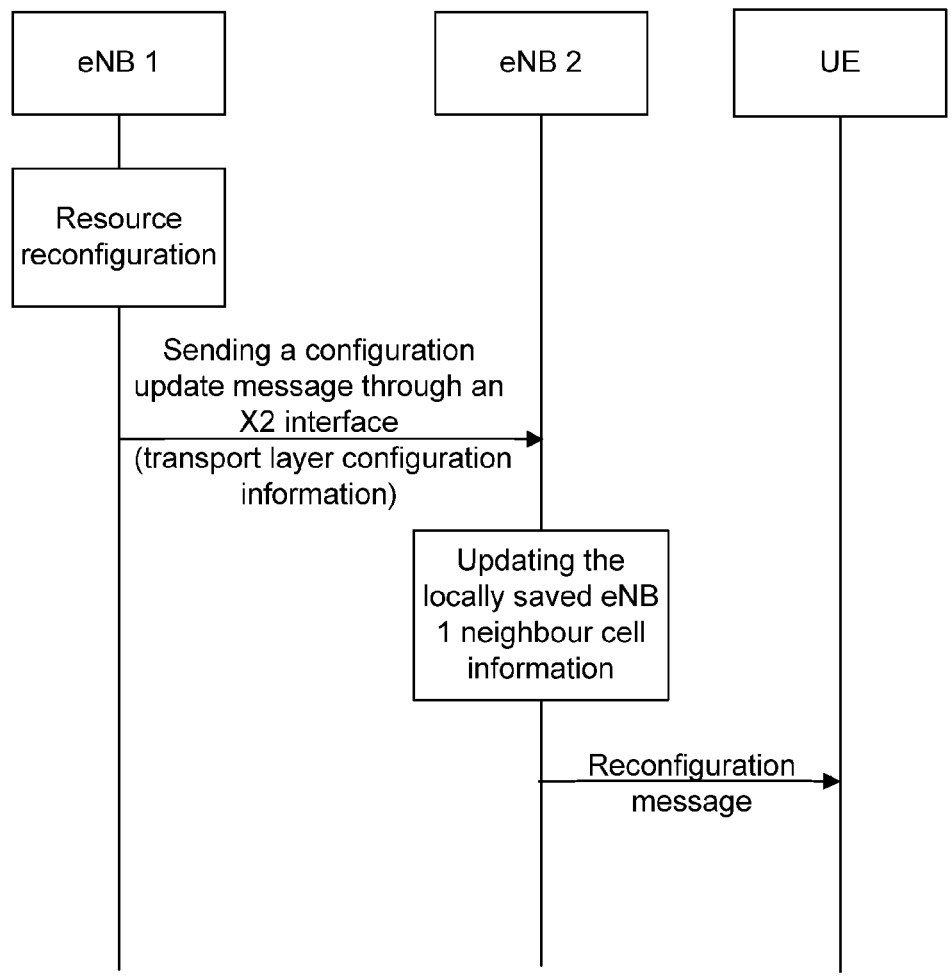
FIG. 3 is a schematic view of the specific realization process according to the first embodiment of the disclosure, in which eNB 1 interacts with a neighbouring base station eNB 2 directly to complete the control of a neighbour relationship in a CRS.

In the process described above, for the neighbouring base station eNB 2 in the same system with the eNB 1, the specific realization process of the method for controlling a neighbour relationship in a CRS is as shown in FIG. 3. The eNB 1 sends a configuration update message through an X2 interface after resource reconfiguration (e.g. addition of a new frequency point) occurred in eNB 1, the configuration update message including the transport layer configuration information after resource reconfiguration occurred in the eNB 1; the eNB 2 receives the configuration update message, acquires the transport layer configuration information after resource reconfiguration occurred in the eNB 1, updates the locally saved neighbour cell information of the eNB 1 (e.g. adds the information relevant to the new frequency point to the locally saved neighbour cell information of the eNB 1), and sends a reconfiguration message to subordinate user equipment (UE), wherein the new frequency point of the eNB 1 is contained in the measurement configuration information of the reconfiguration message.

Figure 4:
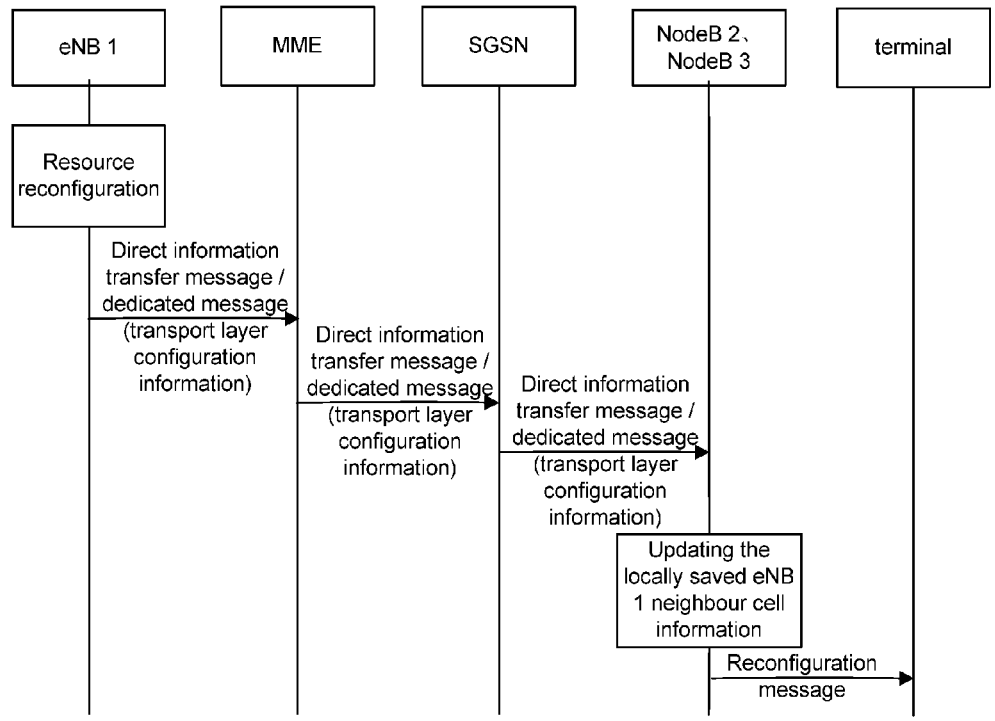
FIG. 4 is a schematic view of the specific realization process according to the first embodiment of the disclosure, in which the eNB 1 interacts with the neighbouring base stations NodeB2 and NodeB3 through a core network node to complete the control of a neighbour relationship in a CRS.

In the process described above, for the neighbouring base station NodeB 2 and NodeB 3 which are not in the same system with the eNB 1, the specific realization process of the method for controlling a neighbour relationship in a CRS may be as shown in FIG. 4. The eNB 1 sends a direct information transfer message (e.g. eNB direct information transfer)/dedicated message (e.g. eNB configuration container transfer) to a Mobility Management Entity (MME) through an S1 interface after resource reconfiguration (e.g. addition of a new frequency point) occurred in eNB 1, the direct information transfer message/dedicated message including the transport layer configuration information after resource reconfiguration occurred in the eNB 1; the MME forwards the direct information transfer message/dedicated message to a Serving GPRS Support Node (SGSN); the SGSN further forwards the direct information transfer message/dedicated message to the NodeB 2 and NodeB 3 through a Iu interface; the NodeB 2 and NodeB 3 receive the direct information transfer message/dedicated message, acquire the transport layer configuration information after resource reconfiguration occurred in the eNB 1, update the locally saved neighbour cell information of the eNB 1 (e.g. add the information relevant to the new frequency point to the neighbour cell information of the eNB 1), and send a reconfiguration message to subordinate terminals, wherein the transport layer configuration information includes a central frequency point identifier (e.g. f1), bandwidth information (e.g. 10 Mhz), an RAT (LTE), a cell identifier (e.g. PCI and/or CGI), a tracking area code (TAC), a target neighbour system (e.g. UMTS), a identifier of a target neighbouring base station (NodeB 2, NodeB 3), a supported network type (e.g. a PLMN list). If the neighbouring base stations NodeB 2 and NodeB 3 belong to a GSM system, then the transport layer configuration information after resource reconfiguration occurred in the eNB 1 is transmitted through the MME and the MSC in the GSM system, the MSC then transmits the transport layer configuration information after resource reconfiguration occurred in the eNB 1 to a base station controller (BSC) through an A/Gb interface, and then the BSC transmits the transport layer configuration information after resource reconfiguration occurred in the eNB 1 to the NodeB2 and NodeB3; the specific process for transmitting the transport layer configuration information is similar to that in FIG. 4 and will not be described here.

Figure 5:
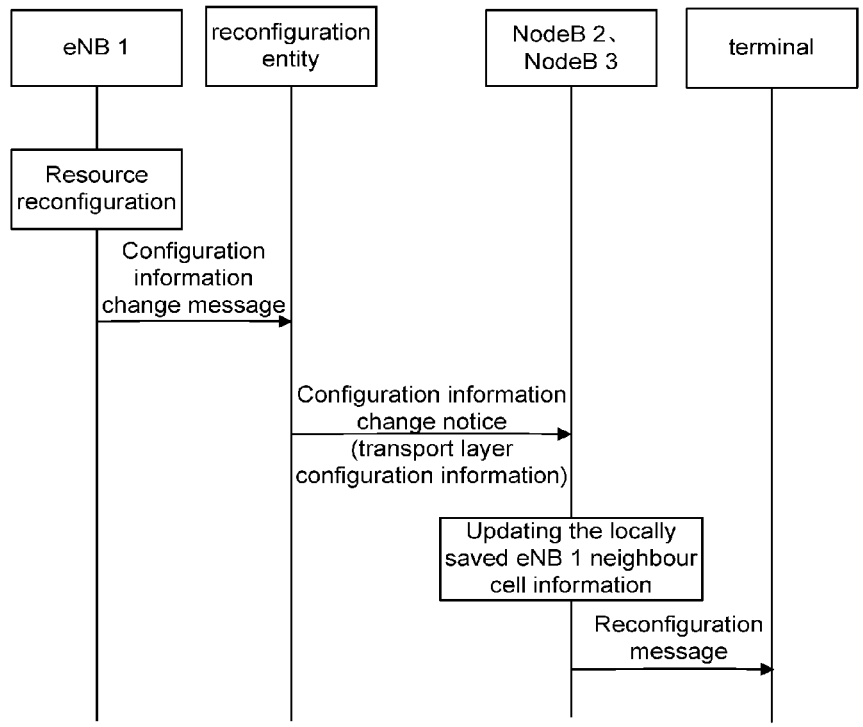
FIG. 5 is a schematic view of the specific realization process according to the first embodiment of the disclosure, in which the eNB 1 interacts with the neighbouring base station NodeB2 and NodeB3 through an upper management node to complete the control of a neighbour relationship in a CRS.

In the process described above, for the neighbouring base stations NodeB2 and NodeB3 which belong to a system different from the eNB 1, when the eNB 1 communicates with the NodeB2 and NodeB3 through an upper management node, the specific realization process of the method for controlling a neighbour relationship in a CRS may be as shown in FIG. 5. The eNB 1 sends a configuration information update message to a reconfiguration entity after resource reconfiguration (e.g. addition of a new frequency point) occurred in the eNB 1, the configuration information update message containing the transport layer configuration information after resource reconfiguration in the eNB 1; the reconfiguration entity sends a configuration information update notification message to the NodeB2 and NodeB3, the configuration information update notification message containing the transport layer configuration information after resource reconfiguration in the eNB 1; the NodeB2 and NodeB3 receive the configuration information update notification message, acquire the transport layer configuration information after resource reconfiguration in the eNB 1, update the locally saved neighbour cell information of the eNB 1 (e.g. add the information relevant to the new frequency point to the locally saved neighbour cell information of the eNB 1), and send the reconfiguration message to subordinate terminals, wherein the new frequency point of the eNB 1 is contained in the measurement configuration information of the reconfiguration message. In addition, the transport layer configuration information after resource reconfiguration in the eNB 1 may also be transmitted through an Element Management System (EMS). The transport layer configuration information here updated after resource reconfiguration in the eNB 1 may include a central frequency point (e.g. f1), bandwidth information (e.g. 10 Mhz), an RAT (e.g. LTE), a cell identifier (e.g. PCI and/or CGI), a target neighbour system (e.g. UMTS), an identifier of a target neighbouring base station (NodeB2 and NodeB3) and a supported network type (e.g. a PLMN list).

Second Embodiment

An LTE system is taken as an example to illustrate the specific realization process of the method for controlling a neighbour relationship in a CRS in this embodiment, the realization processes in other systems such as GSM, UMTS are similar.

Figure 6:
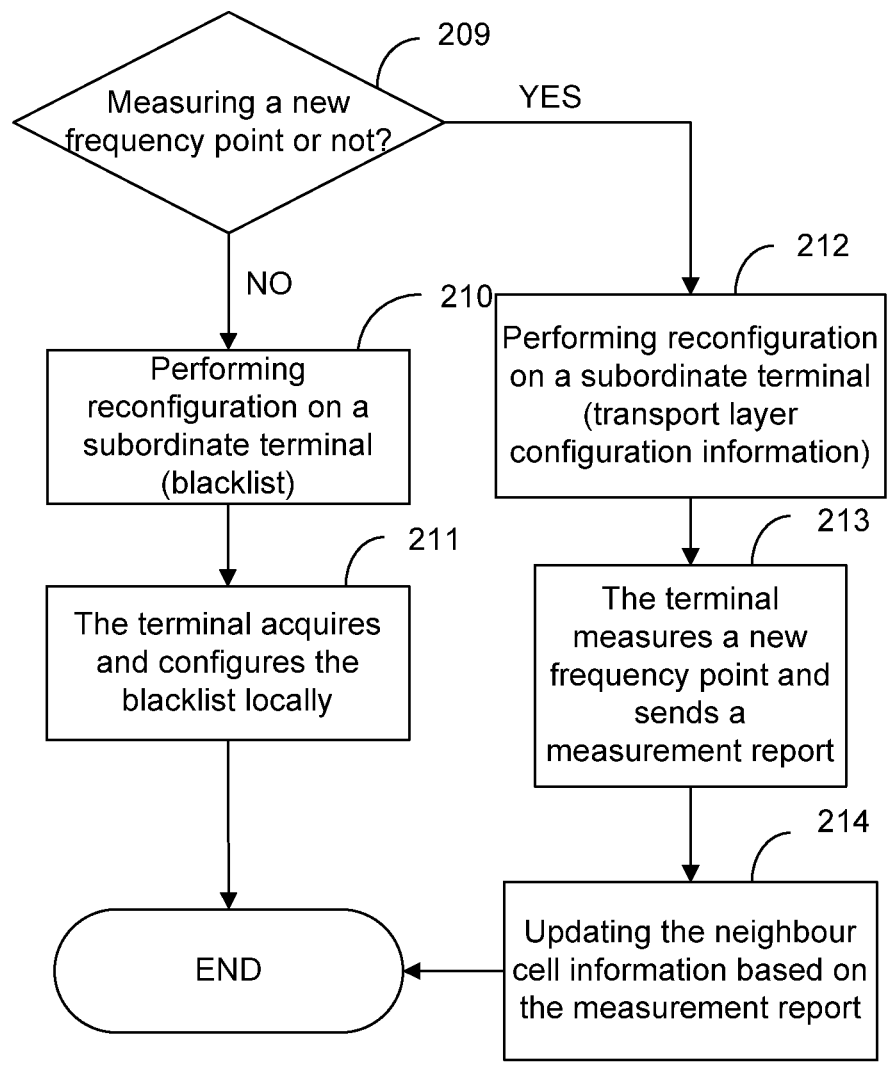
FIG. 6 is a flowchart for realization of the control method for a neighbour relationship in a CRS according to a second embodiment of the disclosure.

As shown in FIG. 6, in the embodiment, the eNB 1 transmits updated transport layer configuration information to a neighbouring base station after the new frequency point is added, wherein the transport layer configuration information includes, besides each information described in the first embodiment, effective time of a frequency point. After the neighbouring base station receives and updates the transport layer configuration information, that is, after the Step 208 in the process described in the first embodiment, the specific realization of the method for controlling a neighbour relationship in a CRS may also include the following steps.

Step 209: the neighbouring base station determines whether it is necessary to measure the new frequency point of the eNB 1, then step 210 is executed if it is necessary, otherwise step 212 is executed.

Specifically, the neighbouring base station determines whether the frequency-point effective time in the transport layer configuration information is lower than a preset threshold T1, or determines whether to measure the new frequency point of the eNB 1 according a preset decision; step 210 is then executed if the frequency-point effective time is lower than the preset threshold T1 or the decision is not to measure the new frequency point of the eNB 1; otherwise, step 212 is executed.

Step 210: the neighbouring base station performs reconfiguration on the subordinate terminal through a system broadcast message (e.g. SIB2) or a reconfiguration message, wherein the system broadcast message (e.g. SIB2) or the reconfiguration message includes a blacklist for indicating the subordinate terminal not to measure and report a designated frequency point and/or cell, the blacklist including a new RAT, a new frequency point (f1) and a cell identifier in the transport layer configuration information.

Specifically, the neighbouring base station extracts the new RAT, the new frequency point (f1) and the cell identifier from the transport layer configuration information, configures a blacklist with them and broadcasts a system broadcast message or a reconfiguration message containing this blacklist to the subordinate terminal.

Step 211: the subordinate terminal of the neighbouring base station receives the system broadcast message or the reconfiguration message, acquires the blacklist, configures the blacklist locally, and terminates current process; in this way, the terminal no longer measures and reports the new frequency point of the eNB 1, thereby avoiding the increase in signalling expenditure and terminal consumption, and further reducing the influence of the resource reconfiguration in the eNB 1 on the terminal.

Step 212: the neighbouring base station performs reconfiguration on the subordinate terminal through a system broadcast message (e.g. SIB2) or a reconfiguration message, wherein the system broadcast message or the reconfiguration message includes the information of the new frequency point of the eNB 1.

Step 213: a terminal in an idle state or a connection state acquires the new frequency point of the eNB 1 through the system broadcast message or the reconfiguration message, measures the new frequency point and reports the acquired measurement report to the neighbouring base station when in a connection state; the measurement report may include an RAT, a new frequency point identifier of eNB 1, and signal intensity of this new frequency point (RSRP, RSRQ).

Step 214: the neighbouring base station receives the measurement report which is reported by the subordinate terminal and further updates the locally saved neighbour cell information of the eNB 1 according to the measurement report.

Specifically, the neighbouring base station receives the measurement report which is reported by the subordinate terminal and performs a statistical calculation on the measurement report, for example, determining whether the ratio of the number of measured samples with signal intensity of the new frequency point of the eNB 1 greater than a certain value (Th1) to the number of the measured samples is greater than a preset threshold N, and whether the duration from current moment to the expiration of the effective time of the frequency point is greater than a preset threshold T2, then keeping the locally saved neighbour cell information of the eNB 1 unchanged if the ratio is greater than N and the duration is greater than T2, otherwise, neglecting the new frequency point of the eNB 1, that is, deleting the new frequency point of the eNB 1 from the locally saved neighbour cell information of the eNB 1 and terminating the current process.

In this embodiment, the frequency-point effective time indicates the duration within which the new frequency point may be used effectively. If the frequency-point effective time expires, then the new frequency point cannot be used or carry services any more. The frequency-point effective time may be set at the network side (e.g. configured at the network management side) or at the base station.

What have been described are merely the preferred embodiments of the disclosure, but not to limit the scope of the disclosure.

What is claimed is:
1. A method for resource configuration and maintenance operation neighboring base station(s) in a cognitive radio system (CRS), comprising:
   when resource reconfiguration occurs in a serving base station, actively notifying, by the serving base station, a neighbouring base station of transport layer configuration information after the resource reconfiguration;
   receiving, by the neighbouring base station of a serving base station, the transport layer configuration information of which the serving base station actively notifies the neighbouring base station after resource reconfiguration, and performing a maintenance operation on locally saved neighbour cell information of the serving base station;
   sending, by the neighbouring base station, the transport layer configuration information to a subordinate terminal after receiving the transport layer configuration information, wherein the transport layer configuration information includes a new frequency point of the serving base station;
   measuring, by the subordinate terminal, the new frequency point of the serving base station and reselecting or switching to the new frequency point of the serving base station when signal intensity of the new frequency point of the serving base station is greater than a certain value.

2. The method according to claim 1, wherein the actively notifying a neighbouring base station of transport layer configuration information after resource reconfiguration comprises:
  notifying, by the serving base station, the neighbouring base station of the transport layer configuration information through a direct interface; or,
  notifying, by the serving base station, the neighbouring base station of the transport layer configuration information through a core network node or an upper management node.

3. The method according to claim 2, before actively notifying the neighbouring base station of the transport layer configuration information after the resource reconfiguration, the method further comprising:
  determining, by the serving base station, a necessity of notifying the neighbouring base station based on its payload, and/or resource utilization, and/or a resource reconfiguration type when the resource reconfiguration occurs in the serving base station;
  actively notifying, by the serving base station, the neighbouring base station of the transport layer configuration information after the resource reconfiguration once determining it is necessary to notify the neighbouring base station.

4. The method according to claim 1, before actively notifying the neighbouring base station of the transport layer configuration information after the resource reconfiguration, the method further comprising:
  determining, by the serving base station, a necessity of notifying the neighbouring base station based on its payload, and/or resource utilization, and/or a resource reconfiguration type when the resource reconfiguration occurs in the serving base station;
  actively notifying, by the serving base station, the neighbouring base station of the transport layer configuration information after the resource reconfiguration once determining it is necessary to notify the neighbouring base station.

5. The method according to claim 1, wherein the performing a maintenance operation on locally saved neighbour cell information of the serving base station comprises: performing an addition, or deletion, or modification, or maintenance operation on the locally saved neighbour cell information of the serving base station.

6. The method according to claim 5, before the performing a maintenance operation on locally saved neighbour cell information of the serving base station, the method further comprising:
  sending, by the neighbour base station, the transport layer configuration information of the serving base station to a subordinate terminal and receiving a measurement report which is reported by the subordinate terminal;
  wherein accordingly, the performing a maintenance operation on locally saved neighbour cell information of the serving base station is: performing, by the neighbour base station, the maintenance operation on the locally saved neighbour cell information of the serving base station based on signal intensity, frequency-point effective time and the number of measured samples of a new frequency point of the serving base station in the measurement report.

7. The method according to claim 5, after the performing a maintenance operation on locally saved neighbour cell information of the serving base station, the method further comprising:
  sending, by the neighbour base station, the transport layer configuration information of the serving base station to a subordinate terminal and receiving a measurement report which is reported by the subordinate terminal;
  performing, by the neighbour base station, the maintenance operation on the locally saved neighbour cell information of the serving base station again based on signal intensity, frequency-point effective time and the number of measured samples of a new frequency point of the serving base station in the measurement report.

8. The method according to claim 1, before the performing a maintenance operation on locally saved neighbour cell information of the serving base station, the method further comprising:
  sending, by the neighbour base station, the transport layer configuration information of the serving base station to a subordinate terminal and receiving a measurement report which is reported by the subordinate terminal;
  wherein accordingly, the performing a maintenance operation on locally saved neighbour cell information of the serving base station is: performing, by the neighbour base station, the maintenance operation on the locally saved neighbour cell information of the serving base station based on signal intensity, frequency-point effective time and the number of measured samples of a new frequency point of the serving base station in the measurement report.

9. The method according to claim 1, after the performing a maintenance operation on locally saved neighbour cell information of the serving base station, the method further comprising:
  sending, by the neighbour base station, the transport layer configuration information of the serving base station to a subordinate terminal and receiving a measurement report which is reported by the subordinate terminal;
  performing, by the neighbour base station, the maintenance operation on the locally saved neighbour cell information of the serving base station again based on signal intensity, frequency-point effective time and the number of measured samples of a new frequency point of the serving base station in the measurement report.

10. The method according to claim 1, wherein the transport layer configuration information comprises at least one of following information: a frequency point identifier, a base station identifier, a cell identifier, a tracking area code, an operation mode, a radio access type, bandwidth, frequency-point effective time and a supported network type.

11. The method according to claim 1, wherein the transport layer configuration information comprises at least one of following information: a frequency point identifier, a base station identifier, a cell identifier, a tracking area code, an operation mode, a radio access type, bandwidth, frequency-point effective time and a supported network type.

12. A Cognitive Radio System (CRS) for resource configuration and maintenance operation neighboring base station(s), comprise a serving base station and neighbouring base station(s) of the serving base station, wherein:
  the serving base station is configured to determine a necessity of notifying a neighbouring base station based on a payload, and/or resource utilization, and/or a resource reconfiguration type of the serving base station when resource reconfiguration occurs in the serving base station, and actively notify the neighbouring base station of transport layer configuration information after the resource reconfiguration;

the neighbouring base station is configured to receive transport layer configuration information of which the serving base station actively notifies the neighbouring base station after resource reconfiguration, and perform a maintenance operation on locally saved neighbour cell information of the serving base station;

the neighbouring base station is further configured to send the transport layer configuration information to a subordinate terminal after receiving the transport layer configuration information, wherein the transport layer configuration information includes a new frequency point of the serving base station;

the subordinate terminal is configured to measure the new frequency point of the serving base station and reselect or switch to the new frequency point of the serving base station when signal intensity of the new frequency point of the serving base station is greater than a certain value.

13. The CRS according to claim 12, wherein the serving base station is specifically configured to actively notify the neighbouring base station of the transport layer configuration information through a direct interface; or, notify the neighbouring base station of the transport layer configuration information through a core network node or an upper management node.

14. The CRS according to claim 12, wherein when the neighbouring base station performs the maintenance operation on the locally saved neighbour cell information of the serving base station, the neighbouring base station is specifically configured to perform an addition, or deletion, or modification, or maintenance operation on the locally saved neighbour cell information of the serving base station.

15. The CRS according to claim 12, wherein the neighbour base station is further configured to, before the neighbour base station performs the maintenance operation on the locally saved neighbour cell information of the serving base station, send the transport layer configuration information of the serving base station to a subordinate terminal and receive a measurement report which is reported by the subordinate terminal;

accordingly, when the neighbour base station performs the maintenance operation on the locally saved neighbour cell information of the serving base station, the neighbour base station is further configured to perform the maintenance operation on the locally saved neighbour cell information of the serving base station based on signal intensity, frequency-point effective time and the number of measured samples of a new frequency point of the serving base station in the measurement report.

16. The CRS according to claim 12, wherein after the neighbour base station performs the maintenance operation on the locally saved neighbour cell information of the serving base station, the neighbour base station is further configured to send the transport layer configuration information of the serving base station to a subordinate terminal and receive a measurement report which is reported by the subordinate terminal, and perform the maintenance operation on the locally saved neighbour cell information of the serving base station again based on signal intensity, frequency-point effective time and the number of measured samples of a new frequency point of the serving base station in the measurement report.

17. The CRS according to claim 12, wherein the transport layer configuration information comprises at least one of following information: a frequency point identifier, a base station identifier, a cell identifier, a tracking area code, an operation mode, a radio access type, bandwidth, frequency-point effective time and a supported network type.

18. The CRS according to claim 12, wherein the transport layer configuration information comprises at least one of following information: a frequency point identifier, a base station identifier, a cell identifier, a tracking area code, an operation mode, a radio access type, bandwidth, frequency-point effective time and a supported network type.

* * * * *